(12) United States Patent
Burtovyy et al.

(10) Patent No.: US 11,511,230 B2
(45) Date of Patent: Nov. 29, 2022

(54) HIGH SEPARATION PERFORMANCE POLYDIALKYLSILOXANE PERVAPORATION MEMBRANES

(71) Applicant: PROMERUS, LLC, Brecksville, OH (US)

(72) Inventors: Oleksandr Burtovyy, Brecksville, OH (US); Wei Zhang, Brecksville, OH (US)

(73) Assignee: PROMERUS, LLC, Akron, OH (US)

( * ) Notice: Subject to any disclaimer, the term of this patent is extended or adjusted under 35 U.S.C. 154(b) by 367 days.

(21) Appl. No.: 16/412,494

(22) Filed: May 15, 2019

(65) Prior Publication Data

US 2019/0351372 A1 Nov. 21, 2019

Related U.S. Application Data

(60) Provisional application No. 62/671,669, filed on May 15, 2018.

(51) Int. Cl.
*B01D 61/36* (2006.01)
*B01D 71/70* (2006.01)
*B01D 67/00* (2006.01)
*B01D 69/10* (2006.01)
*B01D 71/34* (2006.01)
(Continued)

(52) U.S. Cl.
CPC ....... *B01D 61/362* (2013.01); *B01D 67/0081* (2013.01); *B01D 69/10* (2013.01); *B01D 71/34* (2013.01); *B01D 71/42* (2013.01); *B01D 71/70* (2013.01); *B01D 69/04* (2013.01); *B01D 69/08* (2013.01); *B01D 69/12* (2013.01); *B01D 2255/20707* (2013.01);
(Continued)

(58) Field of Classification Search
CPC ...... B01D 2255/20707; B01D 2311/10; B01D 2311/14; B01D 2311/2688; B01D 2323/30; B01D 2325/20; B01D 61/362; B01D 67/0081; B01D 69/04; B01D 69/08; B01D 69/10; B01D 69/12; B01D 69/125; B01D 71/34; B01D 71/42; B01D 71/70
See application file for complete search history.

(56) References Cited

U.S. PATENT DOCUMENTS

| | | |
|---|---|---|
| 6,599,633 B1 | 7/2003 | Wolf et al. |
| 2011/0042315 A1 | 2/2011 | Parnas et al. |
| 2015/0353741 A1 | 12/2015 | Liao |

FOREIGN PATENT DOCUMENTS

| | | |
|---|---|---|
| CN | 105 879 720 A | 8/2016 |
| EP | 0 532199 A1 | 3/1993 |

OTHER PUBLICATIONS

Liu et al., Pervaporation Separation of Butanol-Water Mixtures Using Polydimethylsiloxane/Ceramic Composite Membrane, 19 Chinese J. Chem. Eng., 40, 40-44 (2011). (Year: 2011).*

(Continued)

*Primary Examiner* — Magali P Slawski
*Assistant Examiner* — Brad Gordon
(74) *Attorney, Agent, or Firm* — Balaram Gupta

(57) ABSTRACT

A pervaporation membrane formed on a porous support containing a composition encompassing a polysiloxane, a crosslinker and a catalyst are disclosed and claimed. Also disclosed are the fabrication of membranes which exhibit unique separation properties, and their use in the separation of organic volatiles from biomass and/or organic waste, including butanol, ethanol, and the like.

5 Claims, 3 Drawing Sheets

(51) Int. Cl.
*B01D 71/42* (2006.01)
*B01D 69/04* (2006.01)
*B01D 69/08* (2006.01)
*B01D 69/12* (2006.01)

(52) U.S. Cl.
CPC .. *B01D 2311/2688* (2013.01); *B01D 2323/30* (2013.01); *B01D 2325/20* (2013.01)

(56) References Cited

OTHER PUBLICATIONS

Gongping Liu et al: "Pervaporation Separation of ButanolWater Mixtures Using Polydimethylsiloxane/Ceramic CompositeMembrane",Chinese Journal of Chemical Engineering, vol. 19, No. 1, Feb. 1, 2011 (Feb. 1, 2011), pp. 40-44.
Zhang Kai et al: "Preparation of [gamma]-methacryloxypropyl Trimethoxy Silane Cross-linked PDMS Membrane for Pervaporation Recovery of Butanol", Wuhan Univ. Tech., J. (Material Science Ed.), Wuhan Univ. of Technology, CN, vol. 33, No. 2, May 4, 2018 (May 4, 2018), pp. 312-319.

* cited by examiner

HIGH SEPARATION PERFORMANCE POLYDIALKYLSILOXANE PERVAPORATION MEMBRANES

CROSS REFERENCE TO RELATED APPLICATIONS

This application claims the benefit of U.S. Provisional Application No. 62/671,669 filed May 15, 2018, which is incorporated herein by reference in its entirety.

BACKGROUND OF THE INVENTION

Field of the Invention

The present invention relates generally to a pervaporation membrane formed from a series of polydialkylsiloxanes and more specifically use of such membrane films for pervaporation processes.

Description of the Art

Polysiloxanes, for example, polydimethylsiloxane (PDMS) has been used to form membranes which are used in the separation of organic components from an aqueous compositions. See for example, U. S. Patent Application Publication No. US 2015/0020685 A1, which discloses a hollow fiber membrane having dual layers, which are used in liquid and gas separations. However, such hollow fiber membranes may not be suitable for selective separation of alcohols, such as for example, butanols from the fermentation broth under pervaporation conditions. Even more importantly many of such membranes reported in the literature do not exhibit acceptable separation performance to be commercially viable. See also U.S. Pat. No. 5,755,967.

It is well known that pervaporation methods offer unique advantages in that they offer energy efficient approach to separation of certain organic components from aqueous solutions. However, currently available pervaporation methods are still inefficient for the separation of n-butanol from a fermentation broth. That is, to be energy efficient a fermentation broth containing about 1 weight percent of n-butanol should provide at least an enrichment of 25 weight percent or more of n-butanol in the resulting permeate.

A variety of PDMS membranes have been reported in the literature which are suitable as pervaporation membranes for separation of a variety of gas and liquid mixtures including butanols from aqueous solution such as a fermentation broth. It has also been reported that such PDMS membranes offer certain advantages, most notably being antifouling. However, most of such PDMS membranes reported in literature do not provide sufficient separation performance. In general, many of the PDMS membranes reported in the literature are capable of providing an 1-butanol enrichment in the permeate at best to be around 20 weight percent from a starting feed of 1 weight percent 1-butanol. However, in order to be energy efficient the permeate must contain greater than 25 weight percent 1-butanol and at an acceptable flux to be industrially competitive. That is, to be economically practical, the permeates containing greater than 25 weight percent 1-butanol can more readily be purified further by conventional distillation methods. Some researchers have included such filler materials as zeolites and silicalites to improve the selective separation of n-butanols from fermentation broth. However, such approaches also have certain deficiencies, especially, such methods generally require thicker films thus decreasing the flux, i.e., low permeance of the organics through the thick membrane. That is, higher the thickness of the membrane lower the permeability of the organics. See for example, Meagher et al., J. Membrane Science, 192 (2001), 231-242.

Accordingly, it is an object of this invention to provide an industrially scalable polysiloxane pervaporation membrane suitable for the separation of organic matter from aqueous solutions, including industrial waste and/or a fermentation broth.

It is also an object of this invention to provide industrially scalable processes for the separation of n-butanol from aqueous solution such as for example fermentation broth.

Other objects and further scope of the applicability of the present invention will become apparent from the detailed description that follows.

SUMMARY OF THE INVENTION

Advantageously it has now been found that various commercially viable polysiloxane membranes can be made from readily available siloxane compounds which are useful as pervaporation membranes. The membranes formed as disclosed herein are useful for example in separation of organics from biomass or other organic wastes as described herein.

Accordingly, there is provided a pervaporation membrane encompassing:
a) a porous support;
b) a composition coated on said support, said composition consisting of:
i) a polydialkylsiloxane of the formula (I):

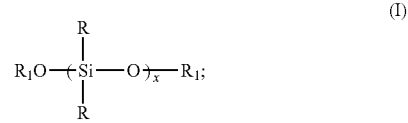

(I)

where x is an integer of at least 10;
R is selected from the group consisting of methyl, ethyl, linear or branched ($C_1$-$C_8$)alkyl, ($C_3$-$C_{12}$)cycloalkyl, ($C_6$-$C_{10}$)aryl and ($C_6$-$C_{10}$)aryl($C_1$-$C_3$)alkyl; and
$R_1$ is selected from the group consisting of hydrogen, methyl, ethyl, linear or branched ($C_1$-$C_8$)alkyl, ($C_3$-$C_{12}$)cycloalkyl, ($C_6$-$C_{10}$)aryl, ($C_6$-$C_{10}$)aryl($C_1$-$C_3$) alkyl, ethenyl, linear or branched ($C_3$-$C_8$)alkenyl, ($C_3$-$C_{12}$)cycloalkenyl, ($C_6$-$C_{10}$)aryl($C_2$-$C_3$)alkenyl, ethynyl, propynyl, linear or branched ($C_4$-$C_8$)alkynyl, $CH(OCOR)_2$ and a group of the formula (A):

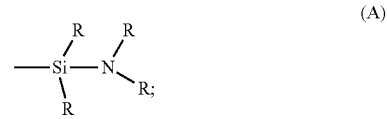

(A)

ii) a crosslinker; and
iii) a catalyst.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION

Figure 1:
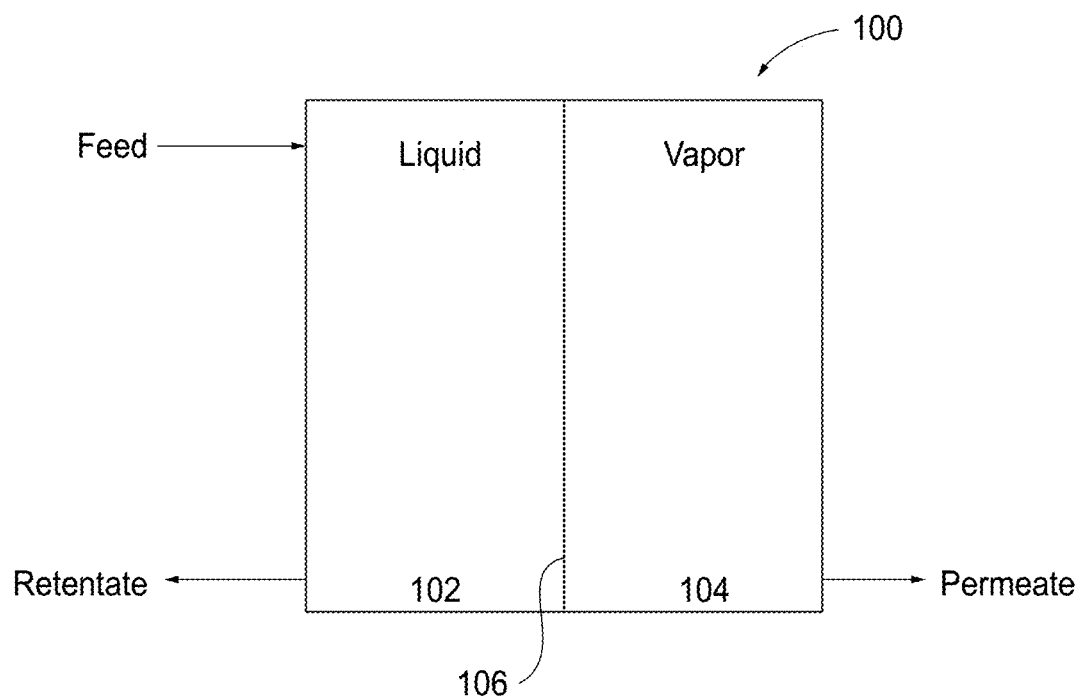
FIG. 1 depicts a pervaporation module in accordance with embodiments of the invention.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the expression "($C_1$-$C_8$)alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "($C_1$-$C_4$)alkoxy", "($C_1$-$C_4$)thioalkyl", "($C_1$-$C_4$)alkoxy($C_1$-$C_4$)alkyl", "hydroxy($C_1$-$C_4$)alkyl", "($C_1$-$C_4$)alkylcarbonyl", "($C_1$-$C_4$)alkoxycarbonyl($C_1$-$C_4$)alkyl", "($C_1$-$C_4$)alkoxycarbonyl", "amino($C_1$-$C_4$)alkyl", "($C_1$-$C_4$)alkylamino", "($C_1$-$C_4$)alkylcarbamoyl($C_1$-$C_4$)alkyl", "($C_1$-$C_4$)dialkylcarbamoyl($C_1$-$C_4$)alkyl" "mono- or di-($C_1$-$C_4$)alkylamino($C_1$-$C_4$)alkyl", "amino($C_1$-$C_4$)alkylcarbonyl", "diphenyl($C_1$-$C_4$)alkyl", "phenyl($C_1$-$C_4$)alkyl", "phenylcarbonyl($C_1$-$C_4$)alkyl" and "phenoxy($C_1$-$C_4$)alkyl" are to be construed accordingly.

As used herein, the expression "cycloalkyl" includes all of the known cyclic radicals. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "($C_2$-$C_6$)alkenyl" includes ethenyl and straight-chained or branched propenyl, butenyl, pentenyl and hexenyl groups. Similarly, the expression "($C_2$-$C_6$)alkynyl" includes ethynyl and propynyl, and straight-chained or branched butynyl, pentynyl and hexynyl groups.

As used herein the expression "($C_1$-$C_4$)acyl" shall have the same meaning as "($C_1$-$C_4$)alkanoyl", which can also be represented structurally as "R—CO—," where R is a ($C_1$-$C_3$)alkyl as defined herein. Additionally, "($C_1$-$C_3$)alkylcarbonyl" shall mean same as ($C_1$-$C_4$)acyl. Specifically, "($C_1$-$C_4$)acyl" shall mean formyl, acetyl or ethanoyl, propanoyl, n-butanoyl, etc. Derived expressions such as "($C_1$-$C_4$)acyloxy" and "($C_1$-$C_4$)acyloxyalkyl" are to be construed accordingly.

As used herein, the expression "($C_6$-$C_{10}$)aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art. Derived expression, "($C_6$-$C_{10}$)arylsulfonyl," is to be construed accordingly.

As used herein, the expression "($C_6$-$C_{10}$)aryl($C_1$-$C_4$)alkyl" means that the ($C_6$-$C_{10}$)aryl as defined herein is further attached to ($C_1$-$C_4$)alkyl as defined herein. Representative examples include benzyl, phenylethyl, 2-phenylpropyl, 1-naphthylmethyl, 2-naphthylmethyl and the like. It should be further noted that the expressions "arylalkyl" and "aralkyl" mean the same are used interchangeably. Accordingly, the expression "($C_6$-$C_{10}$)aryl($C_1$-$C_4$)alkyl" can also be construed as "($C_6$-$C_{14}$)aralkyl."

In a broad sense, the term "substituted" is contemplated to include all permissible substituents of organic compounds. In a few of the specific embodiments as disclosed herein, the term "substituted" means substituted with one or more substituents independently selected from the group consisting of $C_{1-6}$alkyl, $C_{2-6}$alkenyl, $C_{1-6}$perfluoroalkyl, phenyl, hydroxy, —$CO_2H$, an ester, an amide, $C_1$-$C_6$alkoxy, $C_1$-$C_6$thioalkyl, $C_1$-$C_6$perfluoroalkoxy, —$NH_2$, Cl, Br, I, F, —NH-lower alkyl, and —N(lower alkyl)$_2$. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

Thus, in accordance with the practice of this invention there is provided a pervaporation membrane encompassing:

a) a porous support;

b) a composition coated on said support, said composition consisting of:

i) a curable polydialkylsiloxane of the formula (I):

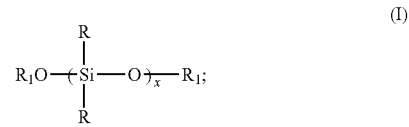

(I)

where x is an integer of at least 10;

R is selected from the group consisting of methyl, ethyl, linear or branched ($C_1$-$C_8$)alkyl, ($C_3$-$C_{12}$)cycloalkyl, ($C_6$-$C_{10}$)aryl and ($C_6$-$C_{10}$)aryl($C_1$-$C_3$)alkyl; and $R_1$ is selected from the group consisting of hydrogen, methyl, ethyl, linear or branched ($C_1$-$C_8$)alkyl, ($C_3$-$C_{12}$)cycloalkyl, ($C_6$-$C_{10}$)aryl, ($C_6$-$C_{10}$)aryl($C_1$-$C_3$)

alkyl, ethenyl, linear or branched $(C_3-C_8)$alkenyl, $(C_3-C_{12})$cycloalkenyl, $(C_6-C_{10})$aryl$(C_2-C_3)$alkenyl, ethynyl, propynyl, linear or branched $(C_4\text{—}C)$alkynyl, $CH(OCOR)_2$ and a group of the formula (A):

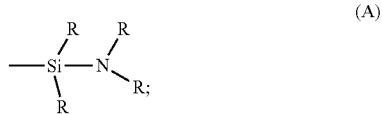

(A)

ii) a crosslinker; and
iii) a catalyst.

Any of the polydialkylsiloxane of the formula (I) can be used to form the pervaporation membrane of this invention. Advantageously, it has now been found that any of the siloxane of formula (I) containing a functional group which is capable of crosslinking with the crosslinker is suitable for this invention. Examples of such functional groups include without any limitation, any crosslinkable unsaturated group including ethylenically unsaturated group, ethynically unsaturated group and the like. In some embodiments, such crosslinking can occur via hydrolysis of the siloxane to silanol, and the resulting silanol crosslinking with the crosslinking agent. All such siloxanes of formula (I) can be employed in this invention.

Accordingly, in some embodiments the ethylenically unsaturated group is of the formula (B):

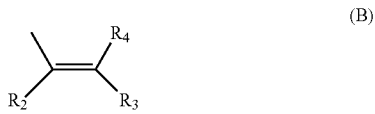

(B)

Where $R_2$, $R_3$ and $R_4$ are the same or different and each independently of one another is selected from the group consisting of hydrogen, methyl, ethyl, linear or branched $(C_1-C_8)$alkyl, $(C_3-C_{12})$cycloalkyl, $(C_6-C_{10})$aryl and $(C_6-C_{10})$aryl$(C_1-C_3)$alkyl.

In some other embodiments the ethynically unsaturated group is of the formula (C):

(C)

Where $R_2$ is as defined above.

In some other embodiments the siloxane of formula (I) is terminated with an amino group. Examples of such amine terminated functional groups include without any limitation dimethylamine, diethylamine, (cyclohexylamino)methyl methyl, (cyclohexylamino)methyl, and the like. Various amino terminated siloxanes are commercially available and all of such siloxanes can be used to form the pervaporation membrane of this invention. For example, ELASTOSIL A07, an organic amine terminated siloxane is available from Wacker Chemie. Other commercially available amine terminated siloxanes include ZIPCONE FN from Gelest, Inc. All such siloxanes can be used in the formation of pervaporation membrane of this invention.

In some other embodiments the siloxane of formula (I) is terminated with an enoxy group. For example, an enoxy terminated siloxane can be prepared by reacting siloxane containing a terminal hydroxy group with acetone. An enoxy terminated siloxane is commercially available under the tradename of ZIPCONE CG and ZIPCONE CE from Gelest, Inc.

In some other embodiments the siloxane of formula (I) is terminated with an alkoxy group. Various alkoxy terminated siloxanes are available commercially, including without any limitation, I-2577 and 3-1944 from Dow Corning and SNAPSIL TN3305 and SNAPSIL TN3050S and ECC 3050S from Momentive.

In some other embodiments the siloxane of formula (I) is a silanol. That is, $R_1$ is hydrogen such that it can react with crosslinker directly to form the crosslinked product.

It should be further noted that any other suitable crosslinkable end groups can be present in the siloxane of formula (I) such that it will readily crosslink with the crosslinking agent as used herein to form the pervaporation membrane. Such other crosslinkable groups include without any limitation pendant ester group containing acrylate terminated group, allyl terminated group, and the like.

The polysiloxane of formula (I) that is suitable to be employed in this invention has a repeat units of at least 10, i.e., x=10. That is, the polysiloxane of formula (I) used to form the pervaporation membrane of this invention generally exhibit a number average molecular weight ($M_n$) of at least about 1,000. In some other embodiments, the polysiloxane of formula (I) has a $M_n$ of at least about 5,000 (i.e., x is from about 20 to 50). In yet some other embodiments, the polysiloxane of formula (I) has a $M_n$ of at least about 10,000 (i.e., x is from about 40 to 100). In yet some other embodiments, the polysiloxane of formula (I) has a $M_n$ of at least about 20,000 (i.e., x is from about 80 to 200). In yet some other embodiments, the polysiloxane of formula (I) has a $M_n$ of at least about 50,000 (i.e., x is from about 100 to 500). In some other embodiments, the polysiloxane of formula (I) has a $M_n$ of at least about 100,000 (i.e., x is from about 200 to 1000). In yet some other embodiments, the polysiloxane of formula (I) has a $M_n$ higher than 100,000 and can be higher than 500,000 in some other embodiments. The number average molecular weight ($M_n$) of the polymers can be determined by any of the known techniques, such as for example, by gel permeation chromatography (GPC) equipped with suitable detector and calibration standards, such as differential refractive index detector calibrated with narrow-distribution polystyrene standards.

In some embodiments, the pervaporation membrane of this invention contains a siloxane of formula (I) in which:
R is selected from the group consisting of methyl, ethyl, n-propyl, iso-propyl, n-butyl, iso-butyl, tert-butyl, cyclohexyl, phenyl and benzyl;
$R_1$ is selected from the group consisting of hydrogen, methyl, ethyl, n-propyl, iso-propyl, n-butyl, iso-butyl, tert-butyl, 2-propenyl, diacetoxymethyl, amine and aminomethyl.

In some embodiments, the pervaporation membrane of this invention contains a siloxane of formula (I) in which:
R is selected from the group consisting of methyl and ethyl;
$R_1$ is selected from the group consisting of hydrogen, methyl, ethyl, n-propyl and 2-propenyl.

Various siloxanes of formula (I) are commercially available and can be employed as such in this invention. Non-limiting examples of such commercially available polysiloxanes of formula (I) that are suitable in this invention include the following:
Silanol terminated polydimethylsiloxane;
Silanol terminated polydiethylsiloxane;
Silanol terminated poly(methyl)(ethyl)siloxane;

Enoxy terminated polydimethylsiloxane, commercially available under the tradename ZIPCONE CG and CE from Gelest, Inc.;

Diacetoxymethyl terminated polydimethylsiloxane, commercially available under the tradename ZIPCONE FA from Gelest, Inc.

Alkoxy terminated polydimethylsiloxane, commercially available under the tradename I-2577 and 3-1944 from Dow Corning;

Alkoxy terminated polydimethylsiloxane, commercially available under the tradename SNAPSIL TN3305, SNAPSIL TN3705 and ECC3050S from Momentive; and Amine terminated polydimethylsiloxane, commercially available under the tradename ELASTOSIL A07 from Wacker Chemie AG.

Any of the porous support materials that can be used to form the pervaporation membranes of this invention can be employed. Such porous materials include without any limitation an organic or an inorganic material. Non-limiting examples of such inorganic materials include alumina, silica, aluminosilicate, and the like. Various porous shape selective aluminosilicates and silicates are known in the literature, for example, zeolites, silicalite, clay, a porous metallic substrate, and other minerals. All of such materials may be suitable as porous supports to form the pervaporation membranes of this invention.

Non-limiting examples of such organic materials include cellulose acetate, polysulfones, regenerated cellulose, cellulose triacetate, polyether sulfone, polyetherimide, polyvinylidenefluoride (PVDF), aromatic polyamides, aliphatic polyamides, polyimides, polyamide-imides, polyetherimides, polyetheresters, polysulfones, polyvinylidenechloride, polybenzimidazoles, polybenzoxazoles, polyacrylonitrile (PAN), polyamide esters, and polyesters, and combinations, copolymers, and substituted polymers thereof. In some embodiments of this invention, the porous support employed to form the pervaporation membrane of this invention is polyvinylidenefluoride (PVDF). In some other embodiments of this invention, the porous support employed to form the pervaporation membrane of this invention is polyacrylonitrile (PAN).

As noted, the pervaporation membrane of this invention is formed by a crosslinking of the siloxane of the formula (I) with a suitable crosslinking agent onto the porous support. Any of the crosslinking agents that will bring about this crosslinking can be employed to form the pervaporation membrane. Some of the suitable crosslinking agents include a wide variety of alkenylsiloxanes, alkylsiloxanes, alkenylketoximinosilanes and alkenylalkenoxysilanes. Non-limiting specific examples of such crosslinking agents without any limitation include the following:

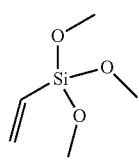

vinyltrimethoxysilane (commercially available under the tradename SIV9220.0 from Gelest, Inc.);

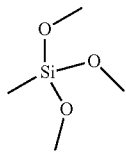

methyltrimethoxysilane (commercially available under the tradename SIM6560.0 from Gelest, Inc.);

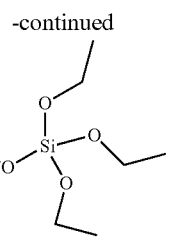

tetraethoxysilane (commercially available under the tradename SIT7110.0 from Gelest, Inc.);

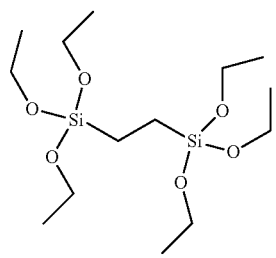

bis(triethoxysilyl)ethanesilane (commercially available under the tradename SIB1817.0 from Gelest, Inc.);

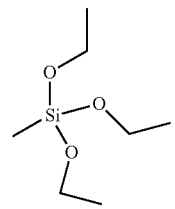

methyltriethoxysilane (commercially available under the tradename SIM6555.0 from Gelest, Inc.);

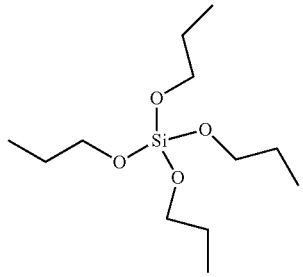

tetra-n-propoxy silane (commercially available under the tradename SIT7777.0 from Gelest, Inc.);

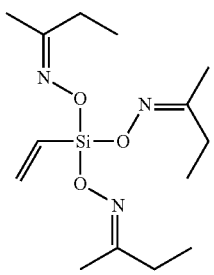

vinyltris(methylethyl-ketoximino)silane (commercially available under the tradename SIV9280.0 from Gelest, Inc.); and

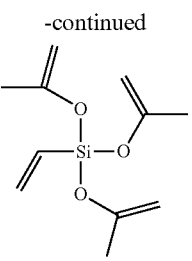

vinyltriisopropenoxysilane (commercially available under the tradename SIV9209.0 from Gelest, Inc.).

Further, the pervaporation membranes on the porous support are formed by the crosslinking of the siloxane of formula (I) with a crosslinking agents as described herein in the presence of a suitable catalyst. Any catalyst that would facilitate the crosslinking of the siloxane can be used to form the pervaporation membrane of this invention. In general, it has now been found that certain organotitanium, organotin compounds, organoiron and organoplatinum compounds are suitable as catalysts for forming the pervaporation membranes of this invention. Various other organic carboxylic acid salts of metals such as for example iron, for example iron octoate, and the like can also be used as catalysts. Specific non-limiting examples of such catalysts may be enumerated as follows:

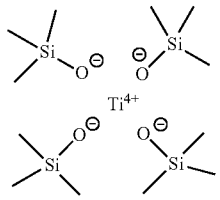

tetrakis(trimethylsiloxy)titanium (commercially available under the tradename SIT7305.0 from Gelest, Inc,);

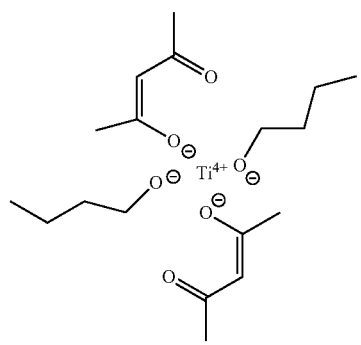

titanium di-n-butoxide bis(2,4-pentanedionate) (commercially available under the tradename AKT853 from Gelest, Inc.);

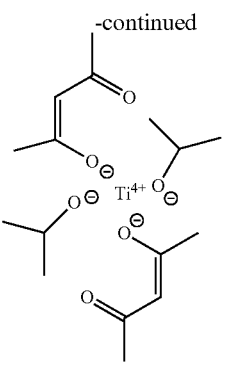

titanium diisopropoxide bis(2,4-pentanedionate) (commercially available under the tradename AKT855 from Gelest, Inc.);

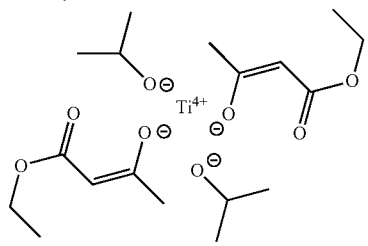

titanium diisopropoxide bis(ethylacetoacetate) (commercially available under the tradename AKT865 from Gelest, Inc.); and

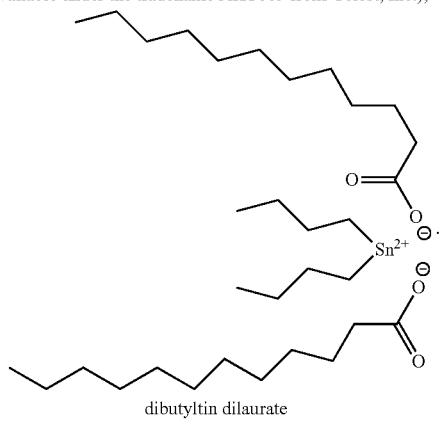

dibutyltin dilaurate

Pervaporation Membrane Applications

As noted, the pervaporation membranes of this invention exhibit several unique properties, and therefore, are useful in several different applications, most notably in the separation of organic components from an aqueous solutions, among others. More specifically, the pervaporation membranes of this invention are useful in the separation of a wide variety of alcohols from the fermentation broth and/or industrial waste.

Most importantly, with the increased interest in producing biological fuel, such as ethanol, butanol, and the like, there is a heightened interest in developing environmentally friendly separation processes that economically separate organic materials from water. There is also growing need for purification of water stream contaminated by an industrial process as well as to the isolation of an organic product from an aqueous fermentation broth designed to form various organic solvents via a biological process, for example, phenol from the broth of a fermentation reactor or any other biologically formed broth, e.g., an algae broth. Also, there is a growing interest in separating value-added products from biological and industrial waste including any biomass-derived waste. While it is well known to use processes such as distillation and gas stripping to effect such separations, these conventional processes, particularly distillation, are generally characterized by high capital and energy costs thus often making such conventional processes problematic, for example, it has been noted that in excess of 60% of the heating value of a biofuel such as butanol can be "wasted" if conventional separation processes are employed.

Even more importantly the organic products, particularly, the organic solvents that are either made by the above noted bio-processes or extracted from organic wastes are gaining more and more industrial applications. For instance, about half of the n-butanol produced and its esters (e.g., n-butyl acetate) are used as solvents in the coatings industry, including as solvents for dyes, e.g., printing inks. Other well known applications of butyl esters of dicarboxylic acids, phthalic anhydride and acrylic acid include as plasticizers, rubber additives, dispersants, semisynthetic lubricants, additives in polishes and cleaners, e.g., floor cleaners and stain removers, and as hydraulic fluids. Butanol and its esters are also used as solvents, including as extractants in the production of drugs and natural products, such as antibiotics, hormones, vitamins, alkaloids and camphor. Various other uses of butanol and its esters and ethers include as solubilizer in the textile industry, e.g., as additive in spinning baths or as carrier for coloring plastics, as additives in de-icing fluids, additive in gasoline for spark-ignition engines, as feedstock for the production of glycol ethers, among various other uses.

Therefore, an alternate process for effecting such separations known as pervaporation has received considerable attention as a solution to the aforementioned "waste". In a pervaporation process, a charge liquid, typically a mixture of two or more liquids, such as a fermentation broth, is brought into contact with a membrane film having the property to allow one component of the charge liquid to preferentially permeate the membrane. This permeate is then removed as a vapor from the downstream side of the membrane film, generally by applying vacuum on the permeate side of the membrane. Particularly, pervaporation process has proven to be a method of choice in the separation of liquid mixtures having similar volatilities, such as azeotropic mixtures that are difficult to separate by conventional methods. While polymers such as polyimides, polyether-polyamide, especially various forms of polydimethylsiloxanes, filled and unfilled, have been used to form pervaporation membranes with some success, none have demonstrated thus far the necessary characteristics needed for a commercially viable membrane material. For example, pervaporation membranes, such as PERVAP 1060 (made from poly(dimethylsiloxane), PDMS), PERVAP 1070 (made from zeolite, ZSM-5, filled PDMS) (Sulzer Chemtech Membrane Systems A.G., Neunkirchen, Germany) and PEBA (block copolymer polyether-polyamide, GKSS-Forschungszentrum Geesthacht GmbH, Geesthacht, Germany) are available for the separation of various low volatile organics from aqueous mixtures. However, there is still a need to develop membranes having better performance, which can provide efficient separation of organics from aqueous mixtures at lower capital and reduced operating cost.

Disclosed herein are embodiments in accordance with the present invention that encompass industrially scalable cross-linked polydialkylsiloxane embodiments, film and film composite embodiments and pervaporation membrane embodiments formed therefrom that advantageously provide hitherto unachievable separation of organics from a variety of mixtures including fermentation broth, industrial waste, among others. In fact, as evidenced from the specific examples that follow the pervaporation membranes of this invention exhibit much superior properties when compared with commercially available Sulzer membranes for the selective separation of n-butanol from an aqueous solution.

Exemplary embodiments of the present invention will be described hereinbelow. Various modifications, adaptations or variations of such exemplary embodiments may become apparent to those skilled in the art as such are disclosed. It will be understood that all such modifications, adaptations or variations that rely upon the teachings of the present invention, and through which these teachings have advanced the art, are considered to be within the scope and spirit of the present invention. For example, while the exemplary embodiments described herein generally reference the separation of butanol and/or phenol from an aqueous charge liquid, such are not meant to limit the present invention only to embodiments for butanol and/or phenol separation. Thus some embodiments of the present invention encompass the separation of any organic material from an aqueous based charge liquid where an appropriate polysiloxane pervaporation membrane can be formed. For example, some embodiments encompass the separation of a hydrophobic organic material from a hydrophilic charge liquid using an appropriate polysiloxane pervaporation membrane. Still other embodiments of the present invention encompass separation of non-polar and polar organic materials. Examples of such separations include, but are not limited to, aromatics such as benzene or toluene from water miscible alcohols such as methanol or ethanol and the separation of non-polar hydrocarbyl-based materials such as hexanes and heptanes from polar heterocarbyl-based materials. Various other organics also include volatile organic solvents, such as tetrahydrofuran (THF), ethyl acetate (EA), acetone, methyl ethyl ketone (MEK), methyl isobutyl ketone (MIBK), and the like, all of which can be present either in a fermentation broth or in an industrial waste.

As noted earlier, various polydimethylsiloxane pervaporation membranes have been reported in literature particularly for the separation of alcohols from aqueous solutions. However, one of the key problems encountered by many of such efforts is that as the thickness of the membrane is increased the flux is lowered.

In addition, plasticization and/or swelling of the membranes generally cause an undesirable increase in permeability of both the organic and water, with the water permeability generally increasing relatively more than the organic permeability thus resulting in a reduction in separation factor. The crosslinked polysiloxane pervaporation membranes of this invention exhibit a behavior opposite as to what is generally expected. Accordingly, by employing the membranes of this invention which generally exhibits less swelling the separation factor is kept constant across various alcohol feed concentrations. Furthermore, polysiloxane pervaporation membranes as described herein exhibit a high permeation of alcohols that increases dramatically with increasing feed concentration even at low thickness of the membranes (that is, an increase in the organic concentration of a feed stream).

Typically in pervaporation, a multi-component liquid stream is passed across a pervaporation membrane that preferentially permeates one or more of the components. As the multi-component liquid stream flows across the pervaporation membrane surface, the preferentially permeated components pass through the pervaporation membrane and are removed as a permeate vapor. Transport through the pervaporation membrane is induced by maintaining a vapor pressure on the permeate side of the pervaporation membrane that is lower than the vapor pressure of the multicomponent liquid stream. The vapor pressure difference can be achieved, for example, by maintaining the multi-component liquid stream at a higher temperature than that of the permeate stream. In this example, the latent heat of evaporation of the permeate components is supplied to the multicomponent liquid stream for maintaining the feed temperature and for continuing the pervaporation process. Alternatively, the vapor pressure difference is typically achieved by operating at below atmospheric pressure on the permeate side of the pervaporation module. A partial vacuum on the permeate side of the polysiloxane pervaporation membrane can be obtained by any one of: relying on the pressure drop that occurs as a result of the cooling and condensation that takes place in the condenser unit, and/or by use of a vacuum pump. An optional sweep gas on the permeate side can facilitate the pervaporation process by lowering the concentration of the permeating components. The vapor pressure of the feed liquid can be optionally raised by heating the fermentation broth. Again as noted, various polysiloxane pervaporation membranes have already been disclosed in the literature, and where such membranes have met with some success, the polysiloxane pervaporation membrane disclosed and claimed herein provide significant improvements over such previously disclosed membranes, which is apparent from the following disclosure.

The pervaporation membranes of this invention can readily be formed by any of the techniques known in the art. For example, a suitable polydialkylsiloxane of formula (I) of this invention including desirable amounts of crosslinking agent and catalysts as described herein are generally dissolved in a suitable organic solvent to form a solution. The polymer solution is then generally filtered through a suitable filter to remove any residual contaminants. After filtration, trapped gas can be removed. The polydialkylsiloxane solution can then be formed into a film by any of the known methods in the art. For instance, the polydialkylsiloxane solution is poured onto a substrate and pulled to form a film. The film is then dried, cured and removed from the substrate, if any, and is ready for use. The films formed in this fashion are generally considered as single thickness films, specific examples of this embodiment are further described below. In some embodiments, the films are cast as double thickness films by forming a second layer of film on the first formed film. In some other embodiments the polydialkylsiloxane solution is applied on to a polymer web to form a reinforced membrane, either on a sheet to form a supported membrane or on a substrate panel to form a non-supported membrane. In other embodiments the polymer solution can be suitably cast to form a tubular composite, or a hollow fiber. Accordingly, in one of the embodiments, the pervaporation membrane of this invention is in a form of a tubular composite, hollow fiber, a dense film flat sheet, or a thin film composite. In some embodiments the pervaporation membranes of this invention can also involve more than one coating of the polysiloxane of formula (I) with a crosslinker and a catalyst. For example, double thickness films can be prepared in a similar manner to the single film except that a second layer of the solution is provided over the first film before the first film is removed from the substrate, and then pulling the second film. After the second pass is pulled, the double film is dried and then removed from the substrate and ready for use.

The coating or application of the composition containing the siloxane of formula (I), a crosslinker and catalyst can be carried out using any of the methods known in the art, such as for example, dip coating, gravure coating, slot-die coating, roll to roll coating onto a support substrate. The support substrates may be the same as the porous substrate or various other films can be used as support substrates. If support substrates are used the porous support substrate is first coated onto the support substrate and then the siloxane composition is coated onto the porous substrate. Various support film substrates known in the art can be used including films of various polymers such as polyethylene terephthalate (PET), polybutylene terephthalate (PBT), nylon, and the like.

After the siloxane composition is coated onto the substrate, the solvent used to form the siloxane composition is removed by air drying and/or heating to suitable temperature. After removal of the solvent, the composite membrane thus formed is either heated to suitable temperature or kept at room temperature for sufficient length of time to cure the siloxane so as to allow complete crosslinking of the siloxane for improved performance. In general such curing is carried out at a temperature from about 50° C. to 60° C. for about 10 to 30 minutes or allowed to cure at room temperature for overnight.

The pervaporation membranes of this invention can be in any suitable form to effect separation of a desirable material, for example butanol, from a fermentation broth. Examples include spiral wound modules, fiber membranes including hollow fiber membranes, tubular membranes, and flat sheet membranes, such as in a plate and frame configuration, a supported or unsupported dense film, or a thin film composite.

When the pervaporation membranes are in an unsupported dense film form, the thickness of the dense film is from about 1 micron to about 500 microns. In another embodiment, the thickness of the dense film is from about 10 microns to about 100 microns.

When the pervaporation membranes are in the form of a thin film composite, such membranes can be thinner than unsupported membranes, for example as thin as about 0.1 microns. Further, the membrane contains at least one layer of polydialkylsiloxane and at least one layer of another component as a support material. Such composites can contain multiple layers of polydialkylsiloxane membranes and multiple layers of other components. Examples of other components include various other polymers and inorganic materials. Examples of such polymers include polyethylenes including TYVEK®, polypropylenes, polyesters, polyimides, polycarbonates, polytetrafluoroethylene, poly(vinylidene fluoride) (PVDF), poly(methyl methacrylate) (PMMA), polyacrylonitrile (PAN), mixed co- and ter-polymers thereof, and the like. Examples of inorganic materials include zeolites, glass frits, carbon powder, metal sieves, metal screens, metal frit, and the like. In some embodiments the pervaporation membranes of this invention are supported on a polyacrylonitrile (PAN) film. In some other embodiments the pervaporation membranes of this invention are supported on a polyvinylidenefluoride (PVDF) film.

A schematic diagram of the pervaporation process is shown in FIG. 1. As depicted, a feed containing numerous species is charged into a pervaporation module 100 and to a liquid chamber 102 on the feed side thereof. Vapor chamber 104 on the permeate side is separated from the liquid chamber 102 by a pervaporation membrane 106. The vapor phase is extracted from the feed liquid through the pervaporation membrane 106 which is selective for a given permeate, and the permeate vapor, which is enriched in the given permeate relative to the feed liquid, and is removed from the pervaporation module 100, generally by condensation thereof.

Utilizing polydialkylsiloxane pervaporation membranes, pervaporation can be employed to treat a fermentation broth containing, for example, biobutanol, ethanol or phenol and one or more other miscible components. More specifically, a fermentation broth can be added to the liquid chamber 102 and thus placed in contact with one side of pervaporation membrane 106 while a vacuum or gas purge is applied to vapor chamber 104. The fermentation broth can be heated or unheated. The components in the fermentation broth sorb into/onto pervaporation membrane 106, permeate through and evaporate into the vapor phase. The resulting vapor or permeate, for example butanol (or phenol), is then condensed and collected. Due to different species in the fermentation broth having different affinities for the pervaporation membrane and different diffusion rates through the membrane, even a component at low concentration in the feed can be highly enriched in the permeate. Accordingly, in one of the embodiments there is provided a pervaporation membrane, which is capable of preferential permeability to a volatile organic over water. The permeability of a volatile organic through pervaporation membrane of the present invention generally increases with increasing organic concentration of a feed stream. In another embodiment, such volatile organics include without any limitation butanol, phenol, and the like.

Figure 2:
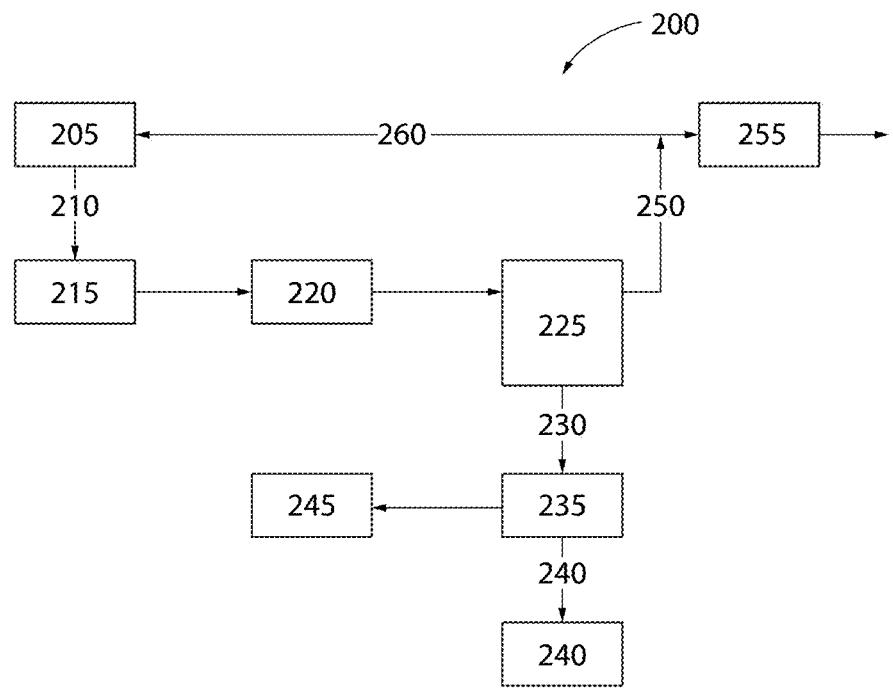
FIG. 2 depicts a pervaporation system in accordance with embodiments of the invention.

FIG. 2 depicts an exemplary pervaporation system 200 that can be employed to separate butanol, or other desirable materials, from a crude fermentation broth (or an aqueous industrial waste or other waste including biomass-waste) containing a valuable organic compound, such as biobutanol or phenol. Crude fermentation broth (or other waste including industrial and/or biomass) as a feed stream 210 from a feed tank 205 is pumped via pump 215 through a heater 220 to increase its temperature. The fermentation broth is then charged under pressure to a pervaporation module 225 containing a pervaporation membrane. Permeate vapor 230 containing butanol (or phenol) is obtained from the pervaporation module 225 by applying vacuum (using vacuum pump 245), where the butanol vapor (or phenol vapor) is condensed in a condenser 235, and collected in collector 240. Residual fermentation broth or retentate stream 250 that does not pass through the polydialkylsiloxane pervaporation membrane can be either discharged (255) from the system 200 or directed to a recycling stream 260 and returned to the feed tank 205.

Supplemental methods that complement the pervaporation process include removing solids from the fermentation broth by centrifugation, filtration, decantation, dephlegmation or the like; and increasing the concentration of butanol in the permeate using adsorption, distillation or liquid-liquid extraction or the like.

Butanol from biomass is often referred to as biobutanol. Biobutanol can be produced by fermentation of biomass by the acetone-butanol-ethanol fermentation (A.B.E.) process. See, for example, S-Y Li, et al. Biotechnol. Prog. 2011, vol. 27(1), 111-120. The process uses the bacterium of the genus *Clostridium*, such as *Clostridium acetobutylicum*, but others including *Saccharomyces cerevisiae, Zymomonas mobilis, Clostridium thermohydrosulfuricum, Escherichia coli, Candida pseudotropicalis*, and *Clostridium beijerinckii*, can be used. Biobutanol can also be made using genetically modified yeasts for the production of biobutanol from cellulosic materials. The crude fermentation broth containing biobutanol can be advantageously processed by the pervaporation membrane depicted in FIG. 1 and/or the pervaporation system depicted in FIG. 2 to provide concentrated butanol, as compared to the concentration thereof in the crude broth. It should further be noted that the pervaporation membranes of this invention are also useful for separation of various alcohols other than butanol, including ethanol and phenol from the respective fermentation broths or industrial or biomass waste.

Fermentation broths generally contain a variety of carbon substrates. In addition to the carbon source, fermentation broths can contain suitable minerals, salts, cofactors, buffers and other components, known to those skilled in the art, suitable for the growth of the cultures and promotion of the enzymatic pathway necessary for butanol production. Examples of fermentation broths that are commercially available include Luria Bertani (LB) broth, Sabouraud Dextrose (SD) broth, or Yeast Medium (YM) broth. Any of these known fermentation broths can be used in the present invention in order to separate the volatile organics from such broths.

Similarly, it should be noted that various other organic products are selectively formed from a fermentation process. For instance, phenol often termed as "green phenol" can be formed from appropriate waste, including biological waste or industrial waste, and by employing appropriate biological organisms to effect the fermentation to proceed selectively to phenol. It has been reported that phenol can be selectively produced from a recombinant strain of the solvent-tolerant bacterium *Pseudomonas putida* S12, see, for example, L. Heerema, et. al. Desalination, 200 (2006), pp 485-487. It has also been reported that various other yeast strains also produce phenol, all of which use bacterium of the genus *Saccharomyces*, such as *Saccharomyces cerevisiae* r.f. *bayanus*, EP 171 Lalvin; *Saccharomyces bayanus*, Ever; *Saccharomyces ellipsoideus*, Ceppo 20 Castelli; *Saccharomyces oviformis*, Ceppo 838 Castelli; *Saccharomyces cerevisiae* r.f. *cerevisiae*, K1 Lalvin; and *Saccharomyces cerevisiae*, D254 Lalvin. These organisms are able to produce different amounts of phenolic substance from a synthetic and/or natural organic sources whose main carbon source is glucose. See, M. Giaccio, J. Commodity Science (1999), 38(4), 189-200. In general, as used herein "green phenol" generically refers to phenol produced by a fermentation broth, which contains phenol from about 0.1% to about 6% phenol. In other embodiments, the fermentation broth contains from about 0.5% to about 3% phenol.

As used herein, "butanol" generically refers to n-butanol and its isomers. In some embodiments in accordance with the present invention, the fermentation broth contains from about 0.1% to about 10% butanol. In other embodiments, the fermentation broth contains from about 0.5% to about 6% butanol. In some other embodiments, the fermentation broth contains from about 1% to about 3% butanol. Generally, the pervaporation membranes described herein are effective at separating volatile organics, such as butanol, ethanol or phenol from fermentation broths containing relatively low to high levels of volatile organics, yet in some embodiments the fermentation broth contains at least about 1% volatile organics.

It should further be noted that certain of the "green phenol" feedstock can also be generated using phenolic based resins, such as novolak resins, and the like. Such feed streams can also be used in the pervaporation process of this invention where the phenol can be separated and/or enriched from the waste stream. Furthermore, various such phenol streams also contain certain inorganic and organic salts as impurities. As a result, it is difficult to remove such inorganic salts from the feed stream and to obtain phenol in the pure enriched form. However, surprisingly it has now been found that the pervaporation membranes of the instant invention are capable of separating such inorganic and organic salts. Representative examples of inorganic salts include, without any limitation, salts of lithium, sodium, potassium, magnesium, calcium, barium and the like. The salts of these metals with any counteranions can be used in this invention. Such examples of non-limiting anions include, phosphate, sulfate, acetate, benzoate, and the like. However, other anions such as methanesulfonate (mesylate), trifluoromethanesulfonate (triflate), p-toluenesulfonate (tosylate), and halides, such as fluoride, chloride, bromide and iodide can also be separated from the feed stream.

In one of the embodiments there is provided a process of separating an organic product from a feedstock selected from a fermentation broth or an industrial waste containing the organic product, such as butanol, ethanol, phenol, THF, ethyl acetate, acetone, toluene, MEK, MIBK, etc. In some embodiments, the fermentation broth is charged to a pervaporation module containing a pervaporation membrane as described herein. The permeate vapor containing the organic product from the pervaporation module is then collected. In this process, it may be advantageous to heat the crude fermentation broth feed to a temperature that facilitates the organic product passage through the pervaporation membrane of this invention. In one embodiment, the crude fermentation broth feed is heated to a temperature from about 30° C. to about 110° C. In another embodiment, the crude fermentation broth feed is heated to a temperature from about 40° C. to about 90° C. In yet another embodiment, the crude fermentation broth feed is heated to a temperature from about 50° C. to about 70° C. It should be noted that the desired temperature may depend upon the type of organics that is being separated. For example, relatively lower temperatures are employed in the separation of butanol whereas somewhat higher temperatures are desirable while separating phenol. Accordingly, in one of the embodiments the fermentation broth containing butanol feed is heated to a temperature in the range of from about 30° C. to about 90° C. In another embodiment the fermentation broth containing phenol feed is heated to a temperature in the range of from about 40° C. to about 110° C.

To facilitate pervaporation, a suitable vacuum can be applied to the vapor chamber of the pervaporation module. In one embodiment, the vacuum applied is from about 0.1 in Hg to about 25 in Hg. In another embodiment, the vacuum applied is from about 0.15 in Hg to about 5 in Hg. In another embodiment, the vacuum applied is from about 0.2 in Hg to about 4 in Hg.

Other processes include methods of increasing a separation factor for an organic product, such as butanol, phenol or ethanol, as a concentration of the organic product increases in a pervaporation feed stream. Such methods involve using a pervaporation membrane to separate the organic product from the pervaporation feed stream.

As used herein, "SF" is the separation factor which is a measure of quality of the separation of a first species relative to a second species and is defined as the ratio of the ratio of permeate compositions to the ratio of the feed compositions.

As used herein, flux is the amount that flows through a unit area of a membrane per unit of time.

Flux and SF can also be described by the following equations:

$$\text{Flux } (J) = \text{mass}/(\text{area} \cdot \text{time})$$

$$\text{Separation Factor } (SF)$$

$$SF_{12} = \left(\frac{y_1/y_2}{x_1/x_2}\right) = \left(\frac{J_1/J_2}{x_1/x_2}\right) = SF_{VLE}SF_{membrane}$$

$$y = \text{Permeate concentration}, x = \text{Feed liquid concentration}$$

Accordingly, the efficiency of a pervaporation membrane can be evaluated at least in two respects, a separation factor (the ratio of enrichment obtained when the liquid mixture permeates through the membrane) and the flux at which a liquid mixture permeates through the polymeric membrane. Thus, the higher the separation factor and flux of a membrane, the higher the separation efficiency of such membrane. Of course this is a very simplified analysis as low separation factors can often be overcome through the use of multistage membrane processes, and where the flux factor of a membrane is low, often forming such a membrane with a high surface area can overcome low flux. Thus while the separation and flux factors are important considerations, other factors such as a membrane's strength, elasticity, resistance to becoming fouled during use, thermal stability, free volume and the like are also important considerations in selecting the best polymer for forming a pervaporation membrane.

Surprisingly, it has now been found that the pervaporation membrane of this invention exhibits a high separation factor (SF) for volatile organics, such as butanol, phenol or ethanol to provide an effective means to remove volatile organics, such as butanol, phenol or ethanol from a fermentation broth or from other waste as described herein. In one embodiment, the pervaporation membrane has a SF for volatile organics, such as butanol, phenol or ethanol of at least about 5. In another embodiment, the pervaporation membrane has a SF for volatile organics, such as butanol, phenol or ethanol of at least about 10. In yet another embodiment, the pervaporation membrane has a SF for volatile organics, such as butanol, phenol or ethanol of at least about 15. In still yet other embodiments, the pervaporation membrane has a SF for volatile organics, such as butanol, phenol or ethanol of at least about 20, at least about 25, or at least about 30. Moreover, any of the foregoing SFs can be achieved when the concentration of volatile organics, such as butanol, phenol or ethanol in a feed stream is 0.5% or higher, 1% or higher, 2% or higher, 3% or higher, or 4% or higher, or 5% or higher, or 6% or higher.

A suitable flux for volatile organics, such as butanol, phenol or ethanol can be achieved using polydialkylsiloxane pervaporation membranes of the present invention to provide an effective means to remove volatile organics, such as butanol, phenol or ethanol from a fermentation broth. In one embodiment, a flux for volatile organics, such as butanol, phenol or ethanol of at least about 100 g/m$^2$/hr can be achieved using such polysiloxane pervaporation membranes. In another embodiment, a flux for volatile organics, such as butanol, phenol or ethanol of at least about 150 g/m$^2$/hr can be achieved; in yet another embodiment, a flux for volatile organics, such as butanol, phenol or ethanol of at least about 200 g/m$^2$/hr can be achieved and in still another embodiment, a flux for volatile organics, such as butanol, phenol or ethanol of at least about 250 g/m$^2$/hr can be achieved using such polysiloxane pervaporation membranes. Furthermore, unlike what is generally found using previously known polydimethylsiloxane pervaporation membranes, any of the foregoing fluxes can be achieved when the concentration of volatile organics, such as butanol, phenol or ethanol in a feed stream is 0.5% or higher, 1% or higher, 2% or higher, 3% or higher, or 4% or higher, or 5% or higher, or 6% or higher.

Surprisingly, it has now been found that various polysiloxanes of formula (I) when suitably crosslinked with a crosslinking agent as described herein are suited for use in forming pervaporation membranes. It has been further observed that suitable combination of crosslinking agent and the catalysts as described herein are well suited for tailoring the resulting pervaporation characteristics (e.g., SF and flux).

More specifically, surprisingly, it has now been found that by practice of this invention it is now possible to enrich n-butanol even from at low concentration in the feed, such as for example, one weight percent to at least about forty (40) weight percent in the permeate. Accordingly, in some embodiments one percent aqueous n-butanol feed into the pervaporation membrane of this invention results in a permeate containing at least twenty five (25) weight percent of n-butanol. In some other embodiments one percent aqueous n-butanol feed into the pervaporation membrane of this invention results in a permeate containing at least thirty (30) weight percent of n-butanol, or a permeate containing at least thirty five (35) weight percent of n-butanol, or a permeate containing at least forty (40) weight percent of n-butanol, or a permeate containing at least forty five (45) weight percent of n-butanol or more.

It should be noted however that the feed containing various different levels of n-butanol can be employed in this invention. Accordingly, the levels of n-butanol in the permeate depend also upon the levels of n-butanol in the feed. In general, lower the level of n-butanol in the feed lower the level of n-butanol in the permeate or vice versa. Accordingly, in some embodiments the level of n-butanol in the feed is from about 0.5 weight percent to about five (5) weight percent, which respectively produces permeate containing n-butanol from about fifteen (15) weight percent n-butanol to about fifty (50) weight percent n-butanol or more.

Similarly, various different feeds containing different alcohols can be employed to enrich the respective alcohol contained therein. Non-limiting examples of such alcohols include ethanol, iso-propanol, iso-butanol, and the like.

In some embodiments there is provided a method of separating an organic product from a feedstock selected from a fermentation broth or a waste containing the organic product comprising:
charging the feedstock to a pervaporation module containing a pervaporation membrane as described herein; and
collecting a permeate vapor containing the organic product from the pervaporation module.

As already noted, the pervaporation can be carried out at any desirable temperature. Thus, in one of the embodiments, pervaporation is carried out where the fermentation broth is charged to the pervaporation module at a temperature from about 30° C. to about 110° C. The vacuum applied to the pervaporation module in this embodiment may range from about 0.1 in Hg to about 25 in Hg.

In this aspect of the method of this invention, the pervaporation membrane is formed by a polysiloxane of formula (I) as described herein in combination with a crosslinking agent and a catalyst as described herein.

In this aspect of the method of this invention the organic product which is separated from biomass or organic waste is butanol, ethanol or phenol.

In another aspect of this invention there is also provided a method of separating volatile organic products, such as for example, butanol or phenol from a feedstock selected from a fermentation broth or a waste containing such volatile organics, such as, butanol or phenol. The method encompasses the following:
charging the feedstock to a pervaporation module containing a pervaporation membrane formed by a polydialkylsiloxane of formula (I) as described herein; and
collecting a permeate vapor containing butanol or phenol from the pervaporation module.

In a further aspect of this invention there is also provided a method of forming a membrane, which encompasses pouring a solution of a polydialkylsiloxane of the formula (I), a crosslinking agent and a catalyst as described herein onto a suitable substrate and drying the substrate at a suitable temperature to form the membrane. As already noted above, the drying of the membrane so formed can be carried out at any of the temperatures to obtain the intended result. Typically, the drying is carried out at a temperature in the range of from about 30° C. to about 120° C., in some other embodiments it is from about 50° C. to 100° C., or from 70° C. to 90° C. The time required to dry the membrane can range from about 10 minutes to 1 day, or 30 minutes to 20 hours, or 1 hour to 16 hours.

Figure 3:
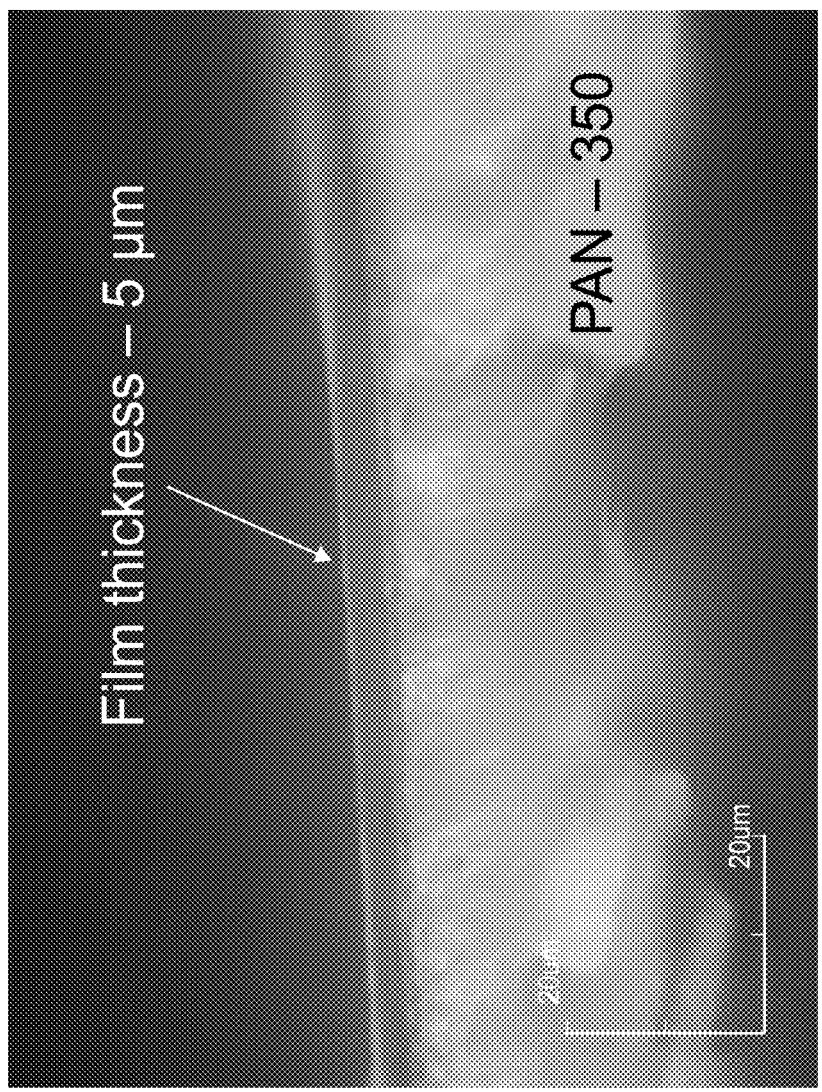
FIG. 3 shows cross sectional optical microscope image of a polysiloxane membrane embodiment of this invention.

Turning now to FIG. 3, which shows cross-sectional view of a pervaporation membrane formed in accordance with the practice of this invention. The pervaporation membrane as shown in FIG. 3 is formed using ZIPCONE CG on a polyacrylonitrile (PAN) support. The ZIPCONE CG layer is uniformly formed on the PAN support having a thickness of about 5 Gm. FIG. 3 further shows that the polysiloxane is not penetrating and plugging the pores of the porous support. It is evident from the specific examples that follow this membrane exhibited superior separation performance using one (1) weight percent n-butanol feed when compared with Sulzer PERVAP 4060™ membrane. This membrane also showed good separation performance using 0.5 weight percent and two (2) weight percent n-butanol feed.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention.

This invention is further illustrated by the following examples which are provided for illustration purposes and in no way limit the scope of the present invention.

EXAMPLES

The following abbreviations have been used hereinbefore and hereafter in describing some of the compounds, instruments and/or methods employed to illustrate certain of the embodiments of this invention:
PDMS: polydimethylsiloxane; ZIPCONE CE: an enoxy terminated PDMS; ZIPCONE CG: an enoxy terminated PDMS; ZIPCONE FA: diacetoxymethyl terminated PDMS; ABE: acetone-butanol-ethanol fermentation broth; SIV9220.0: vinyltrimethoxysilane; SIM6560.0: methyltrimethoxysilane; SIT7110.0: tetraethoxysilane; SIB 1817.0: bis(triethoxysilyl)ethanesilane; SIM6555.0: methyltriethoxysilane; SIT7777.0: tetra-n-propoxy silane; SIV9280.0: vinyltris(methylethyl-ketoximino)silane; SIV9209.0: vinyl-triisopropenoxysilane; SIT7305.0: tetrakis(trimethylsiloxy) titanium; AKT853: titanium di-n-butoxide bis(2,4-pentanedionate); AKT855: titanium diisopropoxide bis(2,4-pentanedionate); AKT865: titanium diisopropoxide bis (ethylacetoacetate); n-BuOH: n-butanol; PGMEA: propylene glycol methyl ether acetate; PTFE: polytetrafluoroethylene; TFT: trifluorotoluene; R. T.—room temperature.

Example 1

Preparation and Evaluation of a Membrane for 1 Weight Percent n-Butanol Single Thickness Film or a Thin Film Composite (TFC) membrane was prepared as follows: A polysiloxane of formula (I) as described in accordance with this invention terminated with a silanol group, i.e., where R=methyl and $R_1$=hydrogen, ($M_w$=77,000 g/mol) is either used as such (i.e., neat) or dissolved in THF along with various crosslinkers and catalysts as summarized in Table 1 to make a solution which is then filtered. After filtration, trapped gas was removed. The solution was then poured onto a substrate and pulled to form a thin layer, cured, dried and ready for use.

In each of the samples prepared as noted above, polysiloxane of formula (I) terminated with silanol group, i.e., where R=methyl and $R_1$=hydrogen, ($M_w$=77,000 g/mol), typically 5 g (or dissolved in THF to make a 40 weight percent solution), one of crosslinkers as listed in Table 1 and one of catalyst as listed in Table 1 are added to this solution, and was filtered through a 0.45 micron PTFE filter. The amount of crosslinker and the catalyst employed was based on the molar ratio of crossslinker's functional group to OH— group and was 60:1, and catalyst ratio was Si—O to Ti or Sn was 50:1. After filtration, the solution was allowed to roll overnight on a jar roller to remove trapped gas introduced during the filtration. The polymer solution was then poured onto a PAN ultrafiltration substrate and pulled, using a Gardner Film Casting Knife to form a film having an essentially uniform thickness. The solvent was allowed to evaporate and film was allowed to crosslink in the air for several minutes to hours at room temperature as listed in Table 1 to form the TFC membrane. In parallel, the film was coated on a glass substrate and the thickness was measured using Dektak profilometer, and thickness of each of which is listed in Table 1.

TABLE 1

| No. | Crosslinker | catalyst | Cure time (min) | thickness, (μm) | n-BuOH in permeate (Weight %) | Flux, (g/m²h) |
|---|---|---|---|---|---|---|
| A | SIV9220.0 | SIT7305.0 | 10 | 26 | 34 | 350 |
| B | SIV9220.0 | AKT853 | 15 | 25 | 34 | 350 |
| C | SIV9220.0 | AKT855 | 12 | 37 | 36 | 220 |
| D | SIV9220.0 | AKT865 | 12 | 29 | 30 | 320 |
| E | SIV9220.0 | Dibutyltin dilaurate | 5 | 45 | 32 | 300 |
| F | SIM6560.0 | SIT7305.0 | 48 hours | 28 | 36 | 290 |
| G | SIM6560.0 | AKT853 | 20 | 36 | 36 | 260 |
| H | SIM6560.0 | AKT855 | 13 | 59 | 35 | 220 |
| I | SIM6560.0 | AKT865 | 11 | 28 | 37 | 330 |
| J | SIT7110.0 | SIT7305.0 | 72 hours | 36 | 34 | 500 |
| K | SIT7110.0 | AKT853 | 45 | 30 | 35 | 450 |
| L | SIT7110.0 | AKT855 | 22 | 25 | 35 | 450 |
| M | SIT7110.0 | AKT865 | 20 | 23 | 33 | 380 |
| N | SIT7110.0 | Dibutyltin dilaurate | 25 | 20 | 33 | 350 |
| O | SIB1817.0 | SIT7305.0 | 20 | 45 | 23 | 350 |
| P | SIB1817.0 | AKT853 | 35 | 40 | 33 | 300 |
| Q | SIB1817.0 | AKT855 | 60 | 65 | 29 | 200 |
| R | SIB1817.0 | AKT865 | 45 | 45 | 31 | 250 |
| S | SIB1817.0 | Dibutyltin dilaurate | 18 hours | 25 | 27 | 270 |
| T | SIM6555.0 | SIT7305.0 | 9 | 25 | 32 | 290 |
| U | SIM6555.0 | AKT853 | 20 | 20 | 35 | 485 |
| V | SIM6555.0 | AKT855 | 9 | 20 | 33 | 515 |
| W | SIM6555.0 | AKT865 | 9 | 45 | 33 | 300 |
| X | SIT7777.0 | SIT7305.0 | 15 | 85 | 37 | 170 |
| Y | SIT7777.0 | AKT853 | 30 | 80 | 37 | 200 |
| Z | SIT7777.0 | AKT855 | 90 | 80 | 29 | 200 |
| AA | SIT7777.0 | Dibutyltin dilaurate | 18 h | 60 | 27 | 200 |
| AB | SIV9280.0 | SIT7305.0 | 3 h | 15 | 27 | 610 |
| AC | SIV9280.0 | AKT853 | 24 | 21 | 27 | 400 |
| AD | SIV9280.0 | AKT855 | 25 | 17 | 27 | 550 |
| AE | SIV9280.0 | AKT865 | 23 | 16 | 27 | 570 |
| AF | SIV9280.0 | Dibutyltin dilaurate | 30 | 10 | 28 | 500 |
| AG | SIV9209.0 | SIT7305.0 | 7 | 20 | 37 | 350 |
| AH | SIV9209.0 | AKT853 | 30 | 26 | 39 | 312 |
| AI | SIV9209.0 | AKT855 | 26 | 24 | 36 | 316 |
| AJ | SIV9209.0 | AKT865 | 25 | 55 | 38 | 180 |
| AK | SIV9209.0 | Dibutyltin dilaurate | 15 | 25 | 40 | 371 |

The membrane was cut into 2 inch diameter circles for installation into a capsule that was then placed in the pervaporation testing device. The charge liquid in the testing device was heated to desired temperature circulating in by-pass mode and then circulated through the membrane housing at 450 mL/min in the continuous mode to check for any leaks. After this check was completed a vacuum (10 torr) was pulled on the dry side of the membrane and any permeate was collected into a cooled trap (cooled with liquid nitrogen). The system was allowed to run for three hours, collected permeate was warmed to room temperature and evaluated. The feed used in each of these Runs A through AK as listed in Table 1 was the same and contained one weight (1.0 wt. %) percent n-butanol aqueous solution. In all of these Runs A through AK as listed in Table 1 the temperature of the feed solution was 60° C.

Evaluation of the Permeate

The room temperature permeate collected as described above was separated into a two-phase liquid. To this permeate, if needed, methanol was added to make the phases miscible, thus providing a single phase permeate. The single phase permeate (1 gram) was added to a GC sampling vial containing 0.02 g PGMEA and mixed thoroughly. A sample from the vial was then injected into a Gas Chromatograph where the % butanol was determined by evaluating the area of the butanol or phenol peak with respect to the PGMEA standard.

The flux observed in each of these Runs A through AK are summarized in Table 1 along with the weight percent of n-butanol in the permeate.

Example 2

This Example 2 illustrates use of certain derivatized commercially available polysiloxanes of formula (I) in accordance with the practice of this invention. Specifically, ZIPCONE FA, a polysiloxane of formula (I) where R is methyl and $R_1$ is diacetoxymethyl was used as such to make the membrane on a PAN substrate substantially following the procedure as set forth in Example 1 to obtain a membrane of thickness about 10 to 30 μm. Similarly, membranes were prepared using ZIPCONE CG and ZIPCONE CE (each a polysiloxane of formula (I) where R is methyl and $R_1$ is 2-propenyl, —C(CH$_3$)=CH$_2$). In some cases as listed in Table 2, THF was used as a solvent to make a solution of ZIPCONE CG before coating onto the substrate. When THF was used a solvent the coated substrates were allowed to dry at room temperature to remove the solvent by evaporation and then crosslinked in air for 4 hours at room temperature. The thickness of the membranes thus formed in each of these cases are listed in Table 2. The performance of these membranes were then compared with that of the commercially available PDMS membrane, PERVAP™ 4060. In each of these membrane preparations the curing was carried out either at room temperature for 4 hours or at 110° C. for a period of time and then at room temperature for 4 hours as summarized in Table 2. The pervaporation test was carried out using a model one weight percent (1.0%) n-butanol substantially in accordance with the procedures as set forth in Example 1 at 60° C. except in one run 37° C. was used as summarized in Table 2. The flux observed in each of these Runs are summarized in Table 2 along with the weight percent of n-butanol in the permeate.

TABLE 2

Pervaporation Performance with One Weight Percent n-Butanol Feed

| Polysiloxane of Formula (I) | Coating conditions | Curing conditions | Thickness (μm) | Temperature, (° C.) | n-BuOH in permeate, (Weight %) | Flux, (g/m²h) |
|---|---|---|---|---|---|---|
| ZIPCONE FA | neat | r.t. for 4 hours | ~10-30 μm | 60 | 34 | 640 |
|  | neat | 110° C. for 30 min then r.t. 4 h | ~10-30 μm | 60 | 35 | 670 |
|  | neat | 110° C. for 20 min then r.t. 4 h | ~10-30 μm | 60 | 34 | 430 |
| ZIPCONE CG | neat | r.t. for 4 hours | 60 | 60 | 34 | 290 |
|  | neat | r.t. for 4 hours | 55 | 60 | 36 | 210 |
|  | from THF | r.t. for 4 hours | 15 | 60 | 35 | 540 |
|  | from THF | r.t. for 4 hours | 3 | 60 | 30 | 2000 |
|  | from THF | r.t. for 4 hours | 3 | 37 | 27 | 680 |
| ZIPCONE CE | neat | r.t. for 4 hours | ~10-60 μm | 60 | 31 | 770 |
| Sulzer-PERVAP ™ 4060 | Not applicable | Not applicable | 2 | 60 | 21 | 1600 |

It is quite apparent from Table 2 that all of the membranes prepared in accordance with this invention, i.e., ZIPCONE FA, CG, and CE provide much better selectivity of n-butanol in the permeate when compared with commercially available PDMS membrane, Sulzer, PERVAP™ 4060 under essentially similar conditions. It is also important to note that the membrane thickness had not much effect on the selective permeability of n-butanol as evidenced from the percent n-butanol in the permeate, which was in the range of 30 to 36% for the membranes prepared in accordance with this invention, however, the flux changed as expected depending upon the thickness of the membrane. More importantly, the flux rate of ZIPCONE CG is much improved over Sulzer PERVAP 4060 even at a thicker coating (3 μm versus 2 μm). Further, it was also shown that the n-butanol selectivity remained reasonably high even at 37° C.

Example 3

Pervaporation Performance with 0.5 Weight Percent n-Butanol Feed

This Example 3 further illustrates the performance of the membranes of this invention in enriching the 0.5 weight percent n-BuOH aqueous solution. The membranes of ZIPCONE FA and CG as prepared in Example 2 were employed in this Example 3 and procedures as set forth in Example 1 were substantially followed except for using model 0.5 weight percent n-BuOH aqueous solution as the feed to determine the permeation flux and n-butanol in the permeate. The feed solution was kept either at 37° C. or 60° C. The thicknesses of the films were varied and were about 5 microns for ZIPCONE FA and about 15 microns for ZIPCONE CG. The results are summarized in Table 3.

TABLE 3

Pervaporation Performance with 0.5 Weight Percent n-Butanol Feed

| Polysiloxane of Formula (I) | Coating conditions | Thickness, µm | Temperature (° C.) | n-BuOH in permeate (Weight %) | Flux, (g/m²h) |
|---|---|---|---|---|---|
| ZIPCONE FA | neat | 15 | 37 | 16 | 270 |
|  | neat | 15 | 60 | 19 | 360 |
| ZIPCONE CG | from THF | 5 | 60 | 18 | 1120 |

From the results summarized in Table 3, it is evident that the membranes formed in accordance with this invention from both ZIPCONE FA and CG exhibit very good separation performance even for a feed containing only 0.5 weight percent n-butanol as well as high flux especially for thinner film as evident from the results obtained for membrane formed from ZIPCONE CG.

Example 4

Pervaporation Performance of Various Alcohols

This Example 4 further illustrates the suitability of the membranes formed in accordance with this invention as a pervaporation membrane for the separation of various alcohols from their respective aqueous solutions. The membranes formed from ZIPCONE FA as described in Example 2 was used in this Example 4 and the pervaporation procedures were followed substantially as set forth in Example 1 with the exception of using various different feeds containing different alcohols: one (1) and two (2) weight percent iso-butanol, five (5) weight percent ethanol and one (1) weight percent isopropanol (IPA) aqueous solutions as summarized in Table 4. Also summarized in Table 4 are the observed permeation flux and percent alcohol in the permeate. The thicknesses of the films were 5 microns or 15 microns.

TABLE 4

Pervaporation Performance of ZIPCONE FA TFC Membrane with Various Alcohols

| Polysiloxane of Formula (I) | Thickness, µm | Alcohol | Alcohol in Feed Weight (%) | Alcohol in permeate Weight %) | Flux (g/m²h) |
|---|---|---|---|---|---|
| ZIPCONE FA | 15 | iso-butanol | 1 | 31 | 400 |
|  | 5 | iso-butanol | 2 | 40 | 1000 |
|  | 15 | iso-butanol | 2 | 48 | 480 |
|  | 15 | ethanol | 5 | 17 | 860 |
|  | 15 | IPA | 1 | 12 | 970 |

Again, it is evident from the data presented in Table 4 that the membranes of this invention show acceptable separation selectivity and flux for separation of various alcohols from their aqueous feed, such as for example a fermentation broth.

Example 5

Pervaporation Performance of Fermentation Broth

This Example 5 illustrates the performance of the membranes of this invention using a fermentation broth. The membranes formed from ZIPCONE FA and ZIPOCONE CG as prepared in accordance with the procedures set forth in Example 2 was used in this Example 5. The pervaporation procedures were followed substantially as set forth in Example 1 with the exception of using respectively a 0.5 and one (1.0) weight percent n-butanol ABE (3:6:1) fermentation broth as a feed to determine the permeation flux and n-butanol in the permeate. The temperature of the feed solution was maintained either at 37° C. or 60° C. as summarized in Tables 5 and 6. The thicknesses of the films were varied and were from about 7 microns to about 20 microns as summarized in Tables 5 and 6. The observed flux for each of these runs and the weight percent of n-butanol in the permeate are summarized in Tables 5 and 6.

TABLE 5

Pervaporation Performance with ABE Fermentation Broth with 0.5 weight percent n-BuOH

| Polysiloxane of Formula (I) | Thickness (µm) | Temperature (° C.) | n-BuOH in permeate (weight %) | Flux (g/m²h) |
|---|---|---|---|---|
| ZIPCONE FA | 20 | 37 | 16 | 90 |
|  | 20 | 60 | 19 | 320 |
| ZIPCONE CG | 10 | 37 | 18 | 200 |
|  | 7-10 | 60 | 18 | 1360 |

TABLE 6

Pervaporation Performance with ABE Fermentation Broth with one (1.0) weight percent n-BuOH

| Polysiloxane of Formula (I) | Thickness (µm) | Temperature (° C.) | n-BuOH in permeate (weight %) | Flux (g/m²h) |
|---|---|---|---|---|
| ZIPCONE FA | 20 | 37 | 29 | 150 |
|  | 20 | 60 | 29 | 430 |
| ZIPCONE CG | 18 | 37 | 29 | 200 |
|  | 18 | 60 | 33 | 500 |

Example 6

Multi-Day Pervaporation Performance with Fermentation Broth

Figure 4A:
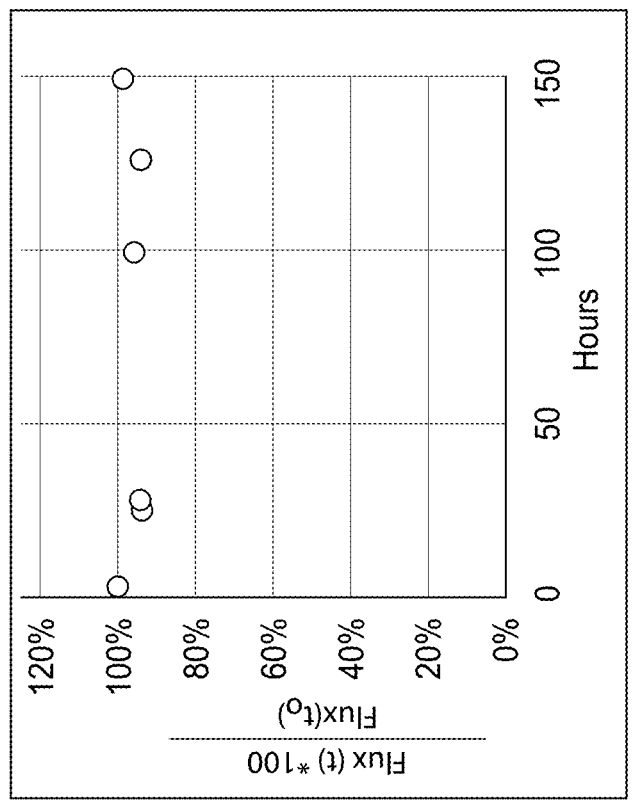
FIG. 4A shows graphical separation factor performance of a polysiloxane membrane embodiment of this invention over time.
Figure 4B:
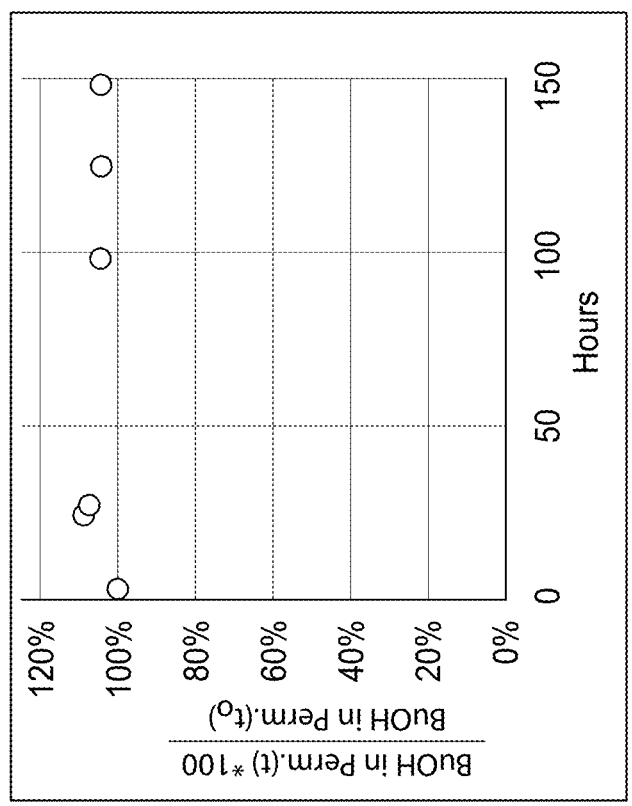
FIG. 4B shows graphical flux performance of a polysiloxane membrane embodiment of this invention over time.

This Example 6 illustrates the excellent performance characteristics of the membranes formed in accordance with this invention. A membrane formed from ZIPOCONE CG as prepared in accordance with the procedures set forth in Example 2 was used in this Example 6. The pervaporation procedures were followed substantially as set forth in Example 1 with the exception of using an actual ABE (3:6:1) fermentation broth as the feed which contained 0.5 weight percent n-butanol. The thickness of the membrane was about 18 microns. The permeation flux and n-butanol in the permeate were measured at regular intervals. The feed solution was maintained at 37° C. The test was run for 150 hours. The concentration of n-butanol in the feed was monitored with GC and kept constant. The membrane was under vacuum for 8-hours straight during the daytime while during the nighttime the feed was continued to circulate through the membrane housing. The feed was changed fresh every day. The results are shown in FIG. 4A and FIG. 4B. FIG. 4A and FIG. 4B show respectively normalized flux and percent n-butanol in the feed over a period of 150 hours, both monitored at regular intervals as shown therein. It is clear from the multi-day results shown in FIG. 4A and FIG. 4B, there is no change in membrane performance over a period of 150 hours with real ABE fermentation broth. That is, the normalized n-BuOH content in the permeate remains at or about the initial amount and the normalized flux remains at the initial flux over a period of 150 hours.

Example 7

Comparative Operability of Membrane Made in Accordance with this Invention and Commercial PDMS Membrane with Fermentation Broth This Example 7 illustrates the comparative operability of the membranes formed in accordance with this invention with commercially available PDMS membrane. The membranes formed from ZIPOCONE CG and ZIPOCONE FA as prepared in accordance with the procedures set forth in Example 2 were used in this Example 7. A membrane was similarly made substantially following the procedures as set forth in Example 1 using a silicone polymer, RTV615, obtained from Momentive Performance Materials, which was cured at 80° C. for 4 hours. A commercially available PDMS membrane from Sulzer, PERVAP 4060, was used as such. The thicknesses of the membrane films were varied and were from about 2 microns to about 50 microns and are summarized in Table 7. The pervaporation procedures were followed substantially as set forth in Example 1 with the exception of using an actual ABE (3:6:1) fermentation broth as the feed which contained one (1.0) weight percent n-butanol. The fermentation broth as feed solution was maintained at 37° C. In each case, the test runs were carried out for a period of three hours. The results are summarized in Table 7.

TABLE 7

Pervaporation Performance with ABE Fermentation Broth with one (1.0) weight percent n-BuOH

| Polysiloxane of Formula (I) | Thickness (μm) | n-Butanol in permeate (Weight %) | Flux (g/m²h) |
|---|---|---|---|
| Sulzer-PERVAP ™ 4060 | 2 | 22 | 1900 |
| RTV615 | 50 | 28 | 180 |
| ZIPCONE FA | 4 | 30 | 1000 |
| ZIPCONE CG | 3 | 28 | 2100 |

It is evident from the data summarized in Table 7 that the membranes prepared in accordance with the present invention, i.e., ZIPCONE CG and FA exhibit much better separation performance (higher butanol percent in the permeate and flux) when compared with commercial PDMS membrane, Sulzer PERVAP™ 4060. Additionally, it should be noted that various other silicone polymers are available commercially, such as RTV615, which may not be suitable to form membranes as described herein. The silicone, RTV615, requires longer cure time at moderately higher temperatures (80° C.) which makes them impractical for use in a roll-to-roll coating, which will be the case with most other similar compositions. Most importantly, the membranes made in accordance with this invention, i.e., membranes made from ZIPOCONE CG and ZIPOCONE FA exhibit excellent antifouling characteristics.

Example 8

Pervaporation Test with Various PDMS Membranes

This Example 8 illustrates that various functionalized PDMS within the scope of the siloxane of formula (I) having different viscosities can be employed to form the membranes of this invention. The commercially available siloxane of formula (I) used in this Example 8 are as follows: a propenyl terminated PDMS (i.e., a polysiloxane of formula (I) where R is methyl and $R_1$ is 2-propenyl) obtained from Gelest, Inc. as ZIPCONE CG and ZIPCONR CE; a methoxy terminated PDMS (i.e., a polysiloxane of formula (I) where R and $R_1$ are both methyl) obtained from Dow Corning as 1-2577 and 3-1944, and from Momentive as SNAPSIL TN3305, ECC 3050S and SNAPSIL TN3705; and amine terminated PDMS (i.e., a polysiloxane of formula (I) where R is methyl and $R_1$ is amino group). All membranes were made substantially in accordance with the procedures set forth in Example 1 except for employing different PDMS as summarized in Table 7 and using the slot-die coating technique in order to obtain uniform 2 to 4 μm siloxane layer on a porous support. However, it was observed that the siloxanes that contained particles, such as Dow Corning 3-1944 and Momentive's SNAPSIL TN3305 were not suitable for the slot-die coating due to negative effect on film quality specifically to form a thin film. The pervaporation procedures were followed substantially as set forth in Example 1 with the exception of using one (1.0) weight percent n-butanol aqueous solution as the feed to determine the permeation flux and n-butanol in the permeate. The feed solution was kept at 60° C. The results are summarized in Table 8. It is evident from the data presented in Table 8 ZIPCONE CG (from Gelest, Inc.) and ECC 3050S (from Momentive) gave high n-butanol in permeate. Both of these siloxanes exhibited short cure time and have moderate viscosity, which facilitates the fabrication of the membrane.

TABLE 8

Pervaporation Performance of Different PDMS Membranes with 0.5% n-Butanol Feed

| Polysiloxane of Formula (I) | $R_1$ of Formula (I) | Viscosity (cP) | Cure time (min) | n-Butanol in permeate (%) |
|---|---|---|---|---|
| ZIPCONE CG | 2-propenyl | 2500 | 5-7 | 35 |
| ZIPCONE CE | 2-propenyl | 70 | 5-7 | 31 |
| 1-2577 | methyl | 1050 | 6 | 20 |
| 3-1944 | methyl | 63000 (particles) | 14 | 33 |
| SNAPSIL TN3305 | methyl | 47000 (particles) | 9 | 39 |
| ECC 3050S | methyl | 550 | 5 | 37 |
| SNAPSIL TN3705 | methyl | 1500 | 7 | 33 |
| ELASTOSIL A07 | amine | 8000 (particles) | 3 | 35 |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A method of separating butanol from a feedstock selected from a fermentation broth or a waste comprising:
    charging the feedstock to a pervaporation module containing a pervaporation membrane formed by a composition comprising:
    i) a polydialkylsiloxane of the formula (I):

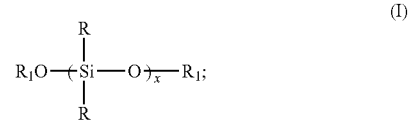

where x is an integer from about 100 to 500 such that the number average molecular weight (Mn) is at least about 50,000;
R is selected from the group consisting of methyl, ethyl, n-propyl, iso-propyl, n-butyl, iso-butyl and tert-butyl; and
$R_1$ is selected from the group consisting of hydrogen, methyl, ethyl, n-propyl, iso-propyl, n-butyl, iso-butyl, tert-butyl, 2-propenyl, diacetoxymethyl, amine and aminomethyl;
ii) a crosslinker selected from the group consisting of methyltriethoxysilane, and vinyltris(methylethyl-ketoximino)silane; and
iii) a catalyst selected from the group consisting of tetrakis(trimethylsiloxy)titanium, titanium di-n-butoxide bis(2,4-pentanedionate), titanium diisopropoxide bis(2,4-pentanedionate), titanium diisopropoxide bis(ethylacetoacetate) and dibutyltin dilaurate; and
collecting a permeate vapor containing butanol from the pervaporation module; wherein said pervaporation module exhibits a flux for butanol of at least about 500 g/m²/hr, and wherein the concentration of butanol in the feedstock is 1 weight percent or higher.

2. The method according to claim 1, wherein the fermentation broth is charged to the pervaporation module at a temperature from about 60° C. to about 110° C.

3. The method according to claim 1, wherein a vacuum from about 0.1 in Hg to about 25 in Hg is applied to the pervaporation module.

4. The method according to claim 1, wherein the pervaporation membrane is formed by a polydialkylsiloxane of the formula (I) where:
R is selected from the group consisting of methyl and ethyl; and
$R_1$ is selected from the group consisting of hydrogen, methyl, ethyl, 2-propenyl, diacetoxymethyl, amine and aminomethyl.

5. The method according to claim 1, wherein the pervaporation membrane is formed by a polydialkylsiloxane of the formula (I) where:
R is methyl; and
$R_1$ is selected from the group consisting of hydrogen and 2-propenyl.

* * * * *